United States Patent
Tawancy

(10) Patent No.: US 7,922,969 B2
(45) Date of Patent: Apr. 12, 2011

(54) CORROSION-RESISTANT NICKEL-BASE ALLOY

(75) Inventor: Hani M. Tawancy, Poughkeepsie, NY (US)

(73) Assignee: King Fahd University of Petroleum and Minerals, Dhahran (SA)

( * ) Notice: Subject to any disclaimer, the term of this patent is extended or adjusted under 35 U.S.C. 154(b) by 652 days.

(21) Appl. No.: 11/819,750

(22) Filed: Jun. 28, 2007

(65) Prior Publication Data

US 2009/0004043 A1    Jan. 1, 2009

(51) Int. Cl.
*C22C 19/05* (2006.01)

(52) U.S. Cl. ......... 420/448; 420/453; 148/410; 148/427

(58) Field of Classification Search ............ 420/442, 420/443, 448, 452, 453, 454; 148/410, 427, 148/428
See application file for complete search history.

(56) References Cited

U.S. PATENT DOCUMENTS

| | | | |
|---|---|---|---|
| 1,710,445 A | 4/1929 | Becket | |
| 1,836,317 A | 12/1931 | Franks | |
| 1,924,245 A | 8/1933 | Koster | |
| 2,109,285 A | 2/1938 | Brown | |
| 2,196,699 A | 4/1940 | Franks | |
| 2,207,380 A | 7/1940 | Kurtz | |
| 2,237,872 A | 4/1941 | Badger, Jr. | |
| 2,315,497 A | 4/1943 | Brennan | |
| 2,959,480 A | 11/1960 | Flint | |
| 3,649,255 A | 3/1972 | Ecer | |
| 3,988,118 A | 10/1976 | Grierson et al. | |
| 4,692,305 A | 9/1987 | Rangaswamy et al. | |
| 4,818,486 A * | 4/1989 | Rothman et al. | ............ 420/442 |
| 5,424,029 A | 6/1995 | Kennedy et al. | |
| 5,529,642 A | 6/1996 | Sugahara et al. | |
| 5,556,594 A | 9/1996 | Frank et al. | |
| 5,599,385 A | 2/1997 | Czech et al. | |
| 6,106,643 A | 8/2000 | Suarez et al. | |
| 6,503,345 B1 | 1/2003 | Klarstrom | |
| 6,610,119 B2 * | 8/2003 | Klarstrom | ................. 75/10.25 |
| 6,632,299 B1 | 10/2003 | Harris | |

(Continued)

FOREIGN PATENT DOCUMENTS

JP    61-014100    *    1/1986

(Continued)

OTHER PUBLICATIONS

Haynes Alloy 242 Technical Brief, Published 2009, 2 pages.*

(Continued)

*Primary Examiner* — George Wyszomierski
*Assistant Examiner* — Mark L Shevin
(74) *Attorney, Agent, or Firm* — Richard C. Litman

(57) ABSTRACT

The corrosion-resistant nickel-base alloy combines thermal stability with corrosion resistance and mechanical strength. The alloy contains balanced proportions of nickel, molybdenum, chromium, and iron with an effective amount of yttrium to stabilize grain boundaries against unwanted reactions, which might degrade corrosion resistance, and an effective amount of boron to maintain an acceptable level of ductility. The alloy may contain minor amounts of additives or impurities, such as silicon, manganese, and aluminum. The alloy may contain between about 25-45% molybdenum, 2-6% chromium, 2-4% iron, 0.01-0.03% boron, 0.005-0.015% yttrium, and up to a maximum of 1% manganese, silicon, and aluminum, respectively, by weight, the balance being nickel. It is preferred that the combined ratio of molybdenum, chromium, and iron to nickel be in the range of about 25% to 45%.

6 Claims, 3 Drawing Sheets

U.S. PATENT DOCUMENTS

| | | | |
|---|---|---|---|
| 6,635,362 B2 | 10/2003 | Zheng | |
| 6,682,780 B2 | 1/2004 | Tzatzov | |
| 6,756,012 B2 | 6/2004 | Prasad | |
| 6,761,854 B1 | 7/2004 | Smith et al. | |
| 6,905,559 B2 | 6/2005 | O'Hara et al. | |
| 7,011,721 B2 | 3/2006 | Harris et al. | |

FOREIGN PATENT DOCUMENTS

| | | | |
|---|---|---|---|
| JP | 02-259037 | * | 10/1990 |

OTHER PUBLICATIONS

Haynes Hastelloy B-3 Alloy Technical Brief, Published 2009, 2 pages.*

English translation of Yoshimoto—JP 02-259037, published Oct. 19$^{th}$, 1990, 13 pages.*

Hayes International Inc. web page, www.hayesintl.com/HB116ahra/H3116Ap3.htm, printed Dec. 2, 2006.

* cited by examiner

CORROSION-RESISTANT NICKEL-BASE ALLOY

BACKGROUND OF THE INVENTION

1. Field of the Invention

The present invention relates to metal alloys, and particularly to a corrosion-resistant nickel-base alloy that has an outstanding combination of corrosion resistance, mechanical strength, and thermal stability.

2. Description of the Related Art

In the middle to late 1920's, it was observed that the corrosion resistance of nickel in reducing environments, particularly in hydrochloric acid, is greatly improved by additions of more than 15-weight percent molybdenum. Molybdenum also improves the corrosion resistance of nickel-base alloys in other nonoxidizing solutions, such as acetic and phosphoric acids. Since then, efforts during the last nine decades to materialize this observation into useful engineering products has led to the development of three major commercial alloys, which are listed in Table 1. Such alloys can find many important applications in the chemical process and petrochemical industries. The first alloy of commercial grade was introduced around 1929 as alloy B (U.S. Pat. No. 1,710,445). As described below, the composition of the alloy was adjusted at various stages of its history to improve fabricability and service performance until it became known as Hastelloy alloy B (Table I).

TABLE I

Nominal Chemical Composition (weight %)

| Element | Hastelloy Alloy B | Hastelloy Alloy B-2 | Hastelloy Alloy B-3 |
|---------|-------------------|---------------------|---------------------|
| Ni | Balance | Balance | Balance |
| Mo | 28 | 28 | 28.5 |
| Cr | 1.0* | 1.0* | 1.5 |
| Fe | 5* | 2* | 1.5 |
| W | — | — | 3.0* |
| Co | 2.5* | 1.0* | 3.0* |
| Si | 1.0* | 0.1* | 0.1* |
| Mn | 1.0* | 1.0* | 3.0* |
| Al | — | — | 0.5* |
| Ti | — | — | 0.2* |
| C | 0.05* | 0.01* | 0.01* |

*Maximum

To facilitate manufacturing and reduce costs, the initial version of alloy B contained relatively high concentrations of iron and carbon, and other impurities, particularly silicon and manganese. At that time, although the alloy could be fabricated by casting, the production of wrought products was impaired by poor hot workability due to the presence of copper. This problem was solved in the 1940's by reducing the copper content while maintaining the same level of corrosion resistance.

Another problem was encountered in welded components due to the formation of secondary phases at grain boundaries of the weld heat-affected zone, which degraded the corrosion resistance. However, the nature of these precipitates could not be identified until the late fifties and early sixties when it was determined that the intergranular precipitates degrading the corrosion resistance were Mo-rich carbides. At that time, it was not possible to reduce the carbon content to a level preventing the formation of carbides. Therefore, in order to eliminate the need for a post-welding heat treatment and to maintain corrosion resistance in the as-welded condition, more emphasis was placed upon reducing the contents of other elements, particularly iron and silicon, which increase the solubility of carbon.

In the meantime, it was thought that any excess carbon could be stabilized by refractory elements, particularly niobium and vanadium. In the mid-sixties, the Hastelloy alloy B-282 was introduced; however, its properties proved to be inferior to those of the Hastelloy alloy B. In the early seventies, it became possible to produce alloys with very low carbon content, which resulted in the development of what is now known as Hastelloy alloy B-2 (Table 1), which is free of vanadium and has low concentrations of silicon and manganese. However, alloy B-2 was then found to be prone to long-range ordering reactions during short-term exposure at temperatures in the range of 600-800° C. In addition to degrading mechanical strength, the phase(s) resulting from these reactions were also found to have adverse effects on corrosion resistance.

Attempts to improve the thermal stability of alloy B-2 led to the development of Hastelloy alloy B-3 (see Table I). Although alloy B-3 has a somewhat higher thermal stability than B-2, it relies only upon slightly decelerating the kinetics of detrimental long-range ordering reactions at temperatures in the range of 600-800° C.

To guard against catastrophic failure resulting from extended exposure at the critical temperatures, there is a market need for another alloy with high molybdenum content to fulfill the requirements of relevant industries, and which is characterized by: i) an extended incubation period for ordering, and ii) an acceptable combination of properties, even in the ordered state.

None of the above inventions and patents, taken either singly or in combination, is seen to describe the instant invention as claimed. Thus, a corrosion-resistant nickel-base alloy solving the aforementioned problems is desired.

SUMMARY OF THE INVENTION

The corrosion-resistant nickel-base alloy combines thermal stability with corrosion resistance and mechanical strength. The alloy contains balanced proportions of nickel, molybdenum, chromium, and iron with an effective amount of yttrium to stabilize grain boundaries against unwanted reactions, which might degrade corrosion resistance, and an effective amount of boron to maintain an acceptable level of ductility. The alloy may contain minor amounts of additives or impurities, such as silicon, manganese, and aluminum. The alloy may contain between about 25-45% molybdenum, 2-6% chromium, 2-4% iron, 0.01-0.03% boron, 0.005-0.015% yttrium, and up to a maximum of 1% manganese, silicon, and aluminum, respectively, by weight, the balance being nickel. It is preferred that the combined ratio of molybdenum, chromium, and iron to nickel be in the range of about 25% to 45% by weight.

In a preferred embodiment, the alloy contains, by weight percentage, about 30% molybdenum, 4% chromium, 3% iron, 0.5% manganese, 0.5% silicon, 0.3% aluminum, 0.015% boron, and 0.01% yttrium, the balance being nickel. The combined ratio of molybdenum, chromium and iron to nickel is about 30% by weight.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
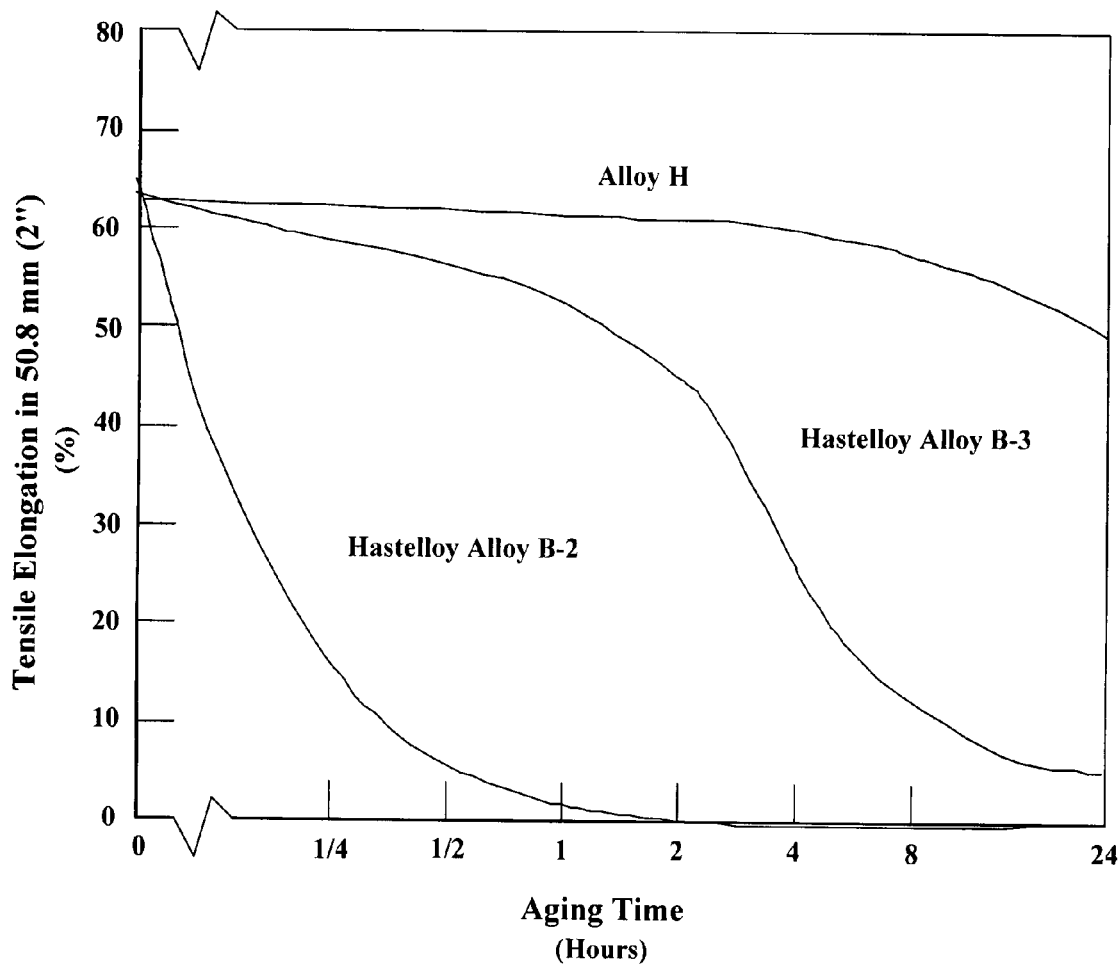
FIG. 1 is a chart showing a comparison of tensile elongation vs. aging time for a corrosion-resistant nickel-base alloy according to the present invention with Hastelloy Alloy B-2 and Hastelloy Alloy B-3.

The corrosion-resistant nickel-base alloy combines thermal stability with corrosion resistance and mechanical strength. The alloy contains balanced proportions of nickel, molybdenum, chromium, and iron with an effective amount of yttrium to stabilize grain boundaries against unwanted reactions, which might degrade corrosion resistance, and an effective amount of boron to maintain an acceptable level of ductility. The alloy may contain minor amounts of additives or impurities, such as silicon, manganese, and aluminum. The alloy may contain between about 25-45% molybdenum, 2-6% chromium, 2-4% iron, 0.01-0.03% boron, 0.005-0.015% yttrium, and up to a maximum of 1% manganese, silicon, and aluminum, respectively, by weight, the balance being nickel. It is preferred that the combined ratio of molybdenum, chromium, and iron to nickel be in the range of about 25% to 45% by weight.

In a preferred embodiment, the alloy contains, by weight percentage, about 30% molybdenum, 4% chromium, 3% iron, 0.5% manganese, 0.5% silicon, 0.3% aluminum, 0.015% boron, and 0.01% yttrium, the balance being nickel. The combined ratio of molybdenum, chromium and iron to nickel is about 30% by weight.

Table II summarizes the composition ranges of the corrosion-resistant nickel-based alloy of the present invention, henceforth referred to as alloy H. Proportions of various elements are adjusted to increase the incubation period for long range ordering reactions, providing better thermal stability compared with known alloys. The corrosion-resistant nickel-base alloy permits control of the size, shape, and distribution of ordered phases. The inventor has found that these variables are the most important in affecting mechanical strength and corrosion resistance, rather the ordering reactions per se. By restructuring various interfaces in the ordered state, it is possible to maintain a fine dispersion of the ordered phases, rather than large platelets, in addition to rendering the grain boundaries less active in chemical reactions. This is achieved by close control of composition, specifically the addition of boron and yttrium to a nickel matrix containing balanced concentrations of molybdenum and chromium.

TABLE II

Chemical Composition of Alloy H (weight %)

| Element | Range | Typical |
|---|---|---|
| Ni | Balance | Balance |
| Mo | 25-40 | 30 |
| Cr | 2-6 | 4 |
| Fe | 2-4 | 3 |
| Mn | 1* | 0.5 |
| Si | 1* | 0.5 |
| Al | 1* | 0.3 |
| B | 0.01-0.03 | 0.015 |
| Y | 0.005-0.015 | 0.01 |
| (Mo + Cr + Fe)/Ni | 0.25-0.45 | about 0.3 |

To maintain a corrosion resistance comparable to or better than known alloys, the minimum molybdenum concentration was kept at about 25 weight percent, with a typical value of about 30 weight percent. At the lower molybdenum levels, smaller concentrations of chromium and iron could be accommodated while maintaining about the same level of corrosion resistance. However, higher molybdenum levels are used to allow for the addition of more chromium and iron, setting the limits to about 2-6 weight percent chromium and 2-4 weight percent iron. Within the above ranges of chromium and iron, and when combined with an addition of boron of at least 0.015 weight percent and up to 0.03 weight percent, the alloy becomes deformable by twinning while in the ordered state, resulting in a significant improvement in tensile ductility (see FIG. 1, which shows a graph of tensile elongation vs. aging time, comparing Alloy H to Hastelloy Alloys B-2 and B-3).

Figure 2:
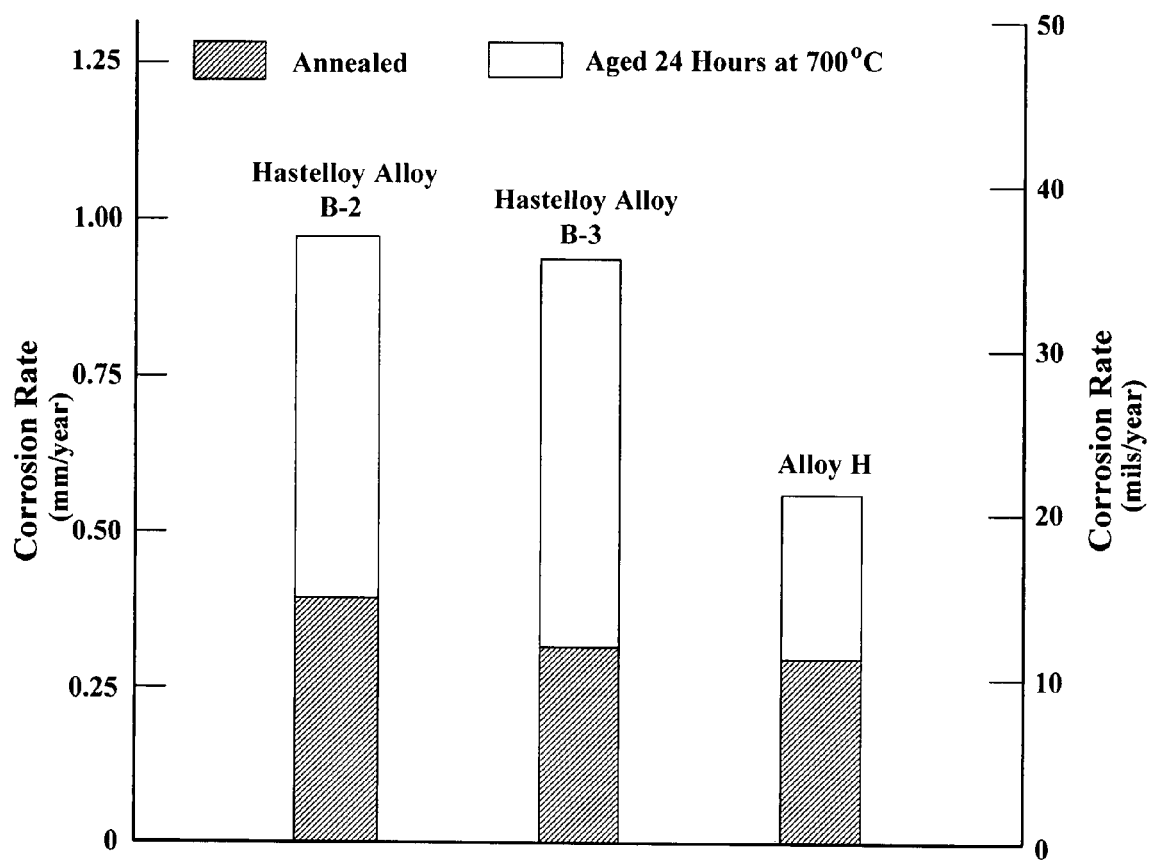
FIG. 2 is a histogram comparing the corrosion rate of annealed and aged samples of the corrosion-resistant nickel-base alloy according to the present invention with Hastelloy Alloy B-2 and Hastelloy Alloy B-3.

Also, the tendency of yttrium to segregate to grain boundaries reduces their energy and renders them less active in chemical reactions. Therefore, an improvement in corrosion resistance can be obtained by the addition of at least 0.005 weight percent yttrium and no more than 0.015 weight percent. FIG. 2 shows a comparison of the corrosion rate of Alloy H with the corrosion rates of Hastelloy Alloys B-2 and B-3. This allowed the nickel-molybdenum-chromium matrix to accommodate more iron, up to about 4 weight percent, which contributes to extending the incubation period for long range ordering reactions, as well as reducing production cost. Other elements may also be present in Alloy H as adventitious impurities or deliberate additions to gain certain benefits known in the art. Some of these elements include silicon, manganese, and aluminum, each of which is set at 1 weight percent or less.

EXAMPLES

Figure 3:
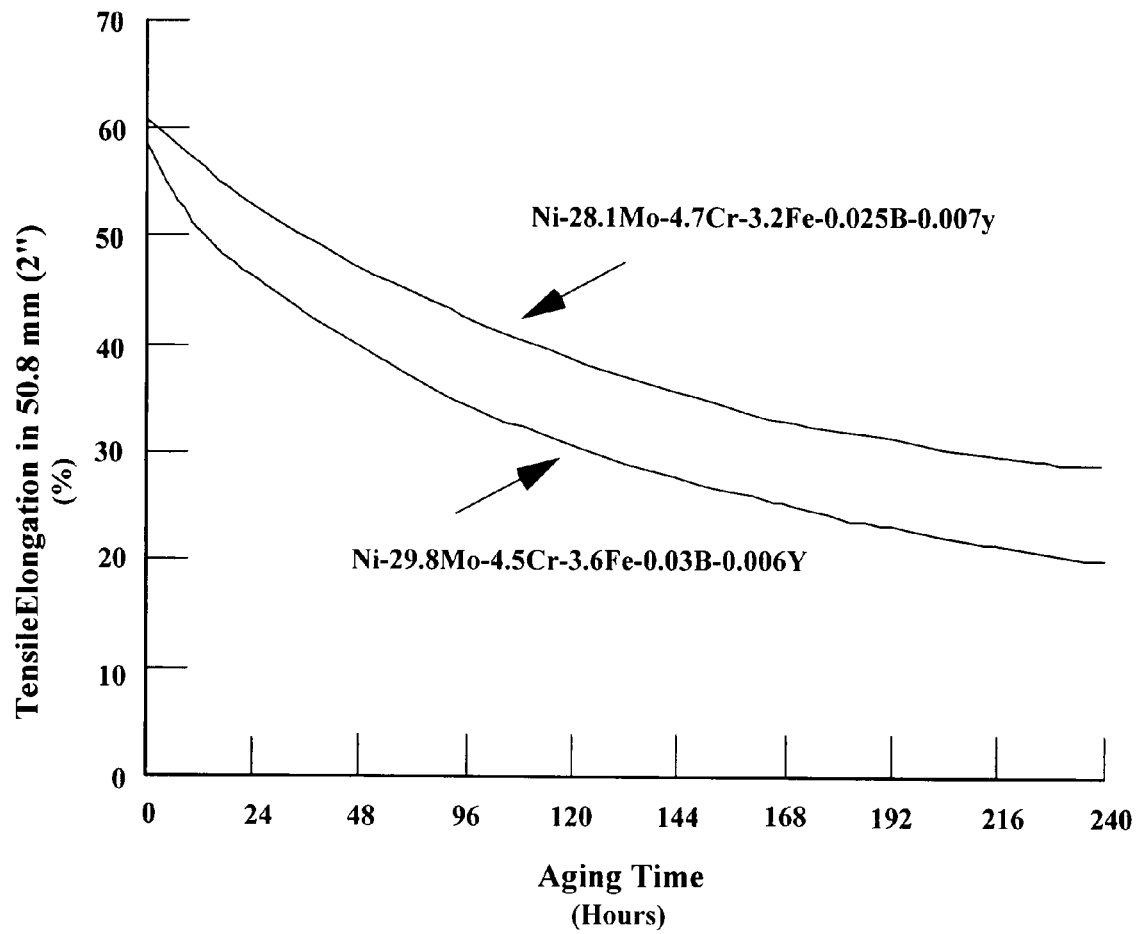
FIG. 3 is a chart showing a comparison of tensile elongation vs. aging time for two sample compositions of a corrosion-resistant nickel-base alloy according to the present invention.

To demonstrate the invention, 100 pound experimental heats of the alloy of the invention were prepared by the standard techniques of vacuum induction melting and electro-slag re-melting to produce ingots about 4" in diameter. The ingots were then forged into slabs about 2"×4". Sheets about 0.06" in thickness were produced by hot and cold rolling. Samples for various tests were annealed at 1100° C. for 20 minutes and then cooled to room temperature producing a fully recrystallized equi-axed grain structure. Annealed samples were aged at temperatures in the range of 600-800° C. Tensile tests and corrosion tests in boiling 20% hydrochloric acid were carried out on both annealed and aged samples, as shown in FIGS. 1-3 and summarized in Table III below.

TABLE III

Effect of Microstructure on Properties
for Typical Alloy H Composition Listed in Table II

| Condition | Tensile Elongation in 2" (50.8 mm) | Corrosion Rate, mils/year (mm/year) | Ordered Phases |
|---|---|---|---|
| Annealed | 63% | 0.30 (12) | None |
| Aged 24 hours at 700° C. | 56% | 0.35 (14) | None |
| Aged 100 hours at 700° C. | 34% | 0.58 (23) | $Ni_2(Cr,Mo)$ + DO22 superlattice |

It is to be understood that the present invention is not limited to the embodiments described above, but encompasses any and all embodiments within the scope of the following claims.

I claim:

1. A corrosion-resistant nickel-base alloy, comprising:
   about 30 weight percent molybdenum;
   about 5 weight percent chromium;
   about 2 weight percent iron;
   from about 0.005 to about 0.015 weight percent yttrium; and
   from about 0.01 to about 0.03 weight percent boron, the balance being nickel.

2. The corrosion-resistant nickel-base alloy according to claim 1, further comprising up to about 1 weight percent manganese.

3. The corrosion-resistant nickel-base alloy according to claim 1, further comprising up to about 1 weight percent silicon.

4. The corrosion-resistant nickel-base alloy according to claim 1, further comprising up to about 1 weight percent aluminum.

5. The corrosion-resistant nickel-base alloy according to claim 1, further comprising:
   up to about 1 weight percent manganese;
   up to about 1 weight percent silicon; and
   up to about 1 weight percent aluminum.

6. A corrosion-resistant nickel-base alloy, consisting of:
   about 30 weight percent molybdenum;
   about 5 weight percent chromium;
   about 2 weight percent iron;
   from about 0.005 to about 0.015 weight percent yttrium;
   from about 0.01 to about 0.03 weight percent boron;
   up to 1 weight percent manganese;
   up to 1 weight percent silicon; and
   up to 1 weight percent aluminum;
   the balance being nickel.

* * * * *